US010705712B2

(12) United States Patent
Milkovic et al.

(10) Patent No.: US 10,705,712 B2
(45) Date of Patent: Jul. 7, 2020

(54) SCROLL SELECT CONTROL FOR USER INTERFACES

(71) Applicant: LendingClub Corporation, San Francisco, CA (US)

(72) Inventors: Thom Milkovic, San Francisco, CA (US); Fernando Lores, Oakland, CA (US); Edward Leffler, Denver, CO (US); Sai Ram Kota, Fremont, CA (US); Kent Lee, Alameda, CA (US)

(73) Assignee: LENDINGCLUB CORPORATION, San Francisco, CA (US)

( * ) Notice: Subject to any disclaimer, the term of this patent is extended or adjusted under 35 U.S.C. 154(b) by 101 days.

(21) Appl. No.: 16/204,986

(22) Filed: Nov. 29, 2018

(65) Prior Publication Data

US 2020/0174636 A1  Jun. 4, 2020

(51) Int. Cl.
*G06F 3/0485* (2013.01)
*G06F 3/0482* (2013.01)

(52) U.S. Cl.
CPC .......... *G06F 3/0485* (2013.01); *G06F 3/0482* (2013.01)

(58) Field of Classification Search
CPC ..................... G06F 3/0485; G06F 3/0482
See application file for complete search history.

(56) References Cited

U.S. PATENT DOCUMENTS

| 6,421,072 | B1* | 7/2002 | Ku | G06F 3/0482 715/804 |
| 8,375,335 | B2* | 2/2013 | Wong | G06F 8/60 715/853 |
| 2004/0100479 | A1* | 5/2004 | Nakano | G06F 1/1626 715/700 |
| 2005/0102629 | A1* | 5/2005 | Chen | G06F 3/0481 715/770 |
| 2007/0100896 | A1* | 5/2007 | Peter | G06F 16/168 |
| 2011/0010669 | A1* | 1/2011 | Basu | G06Q 10/10 715/825 |
| 2013/0227482 | A1* | 8/2013 | Thorsander | G06F 3/0482 715/821 |

* cited by examiner

*Primary Examiner* — Daniel W Parcher
(74) *Attorney, Agent, or Firm* — Hickman Palermo Becker Bingham LLP

(57) ABSTRACT

A bulk-selection control is described in which the same user input action automatically causes both (a) scrolling of a list of visual indicators of items, and (b) selection of the items that correspond to the visual indicators. Specifically, as the visual indicator of an item is scrolled beyond a "selection-triggering position", the visual indicator is visually marked to indicate that the corresponding item is selected, and the corresponding item is automatically added to a set of selected items. When scrolled the opposite direction, the items that have already been added to the set of selected items are not removed therefrom, even if the scrolling operation causes their visual indicators to cease to be beyond the selection-triggering position.

20 Claims, 9 Drawing Sheets

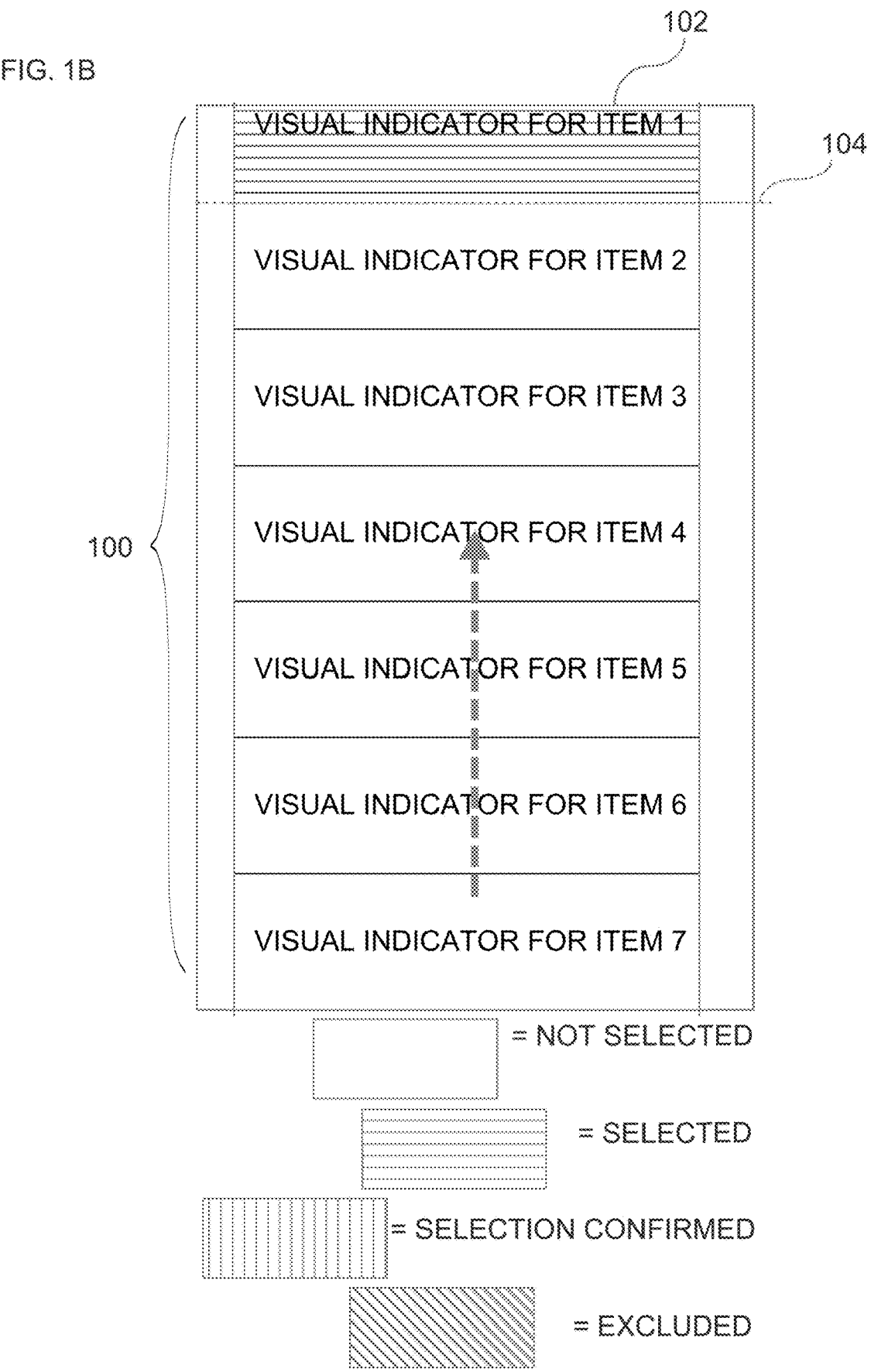

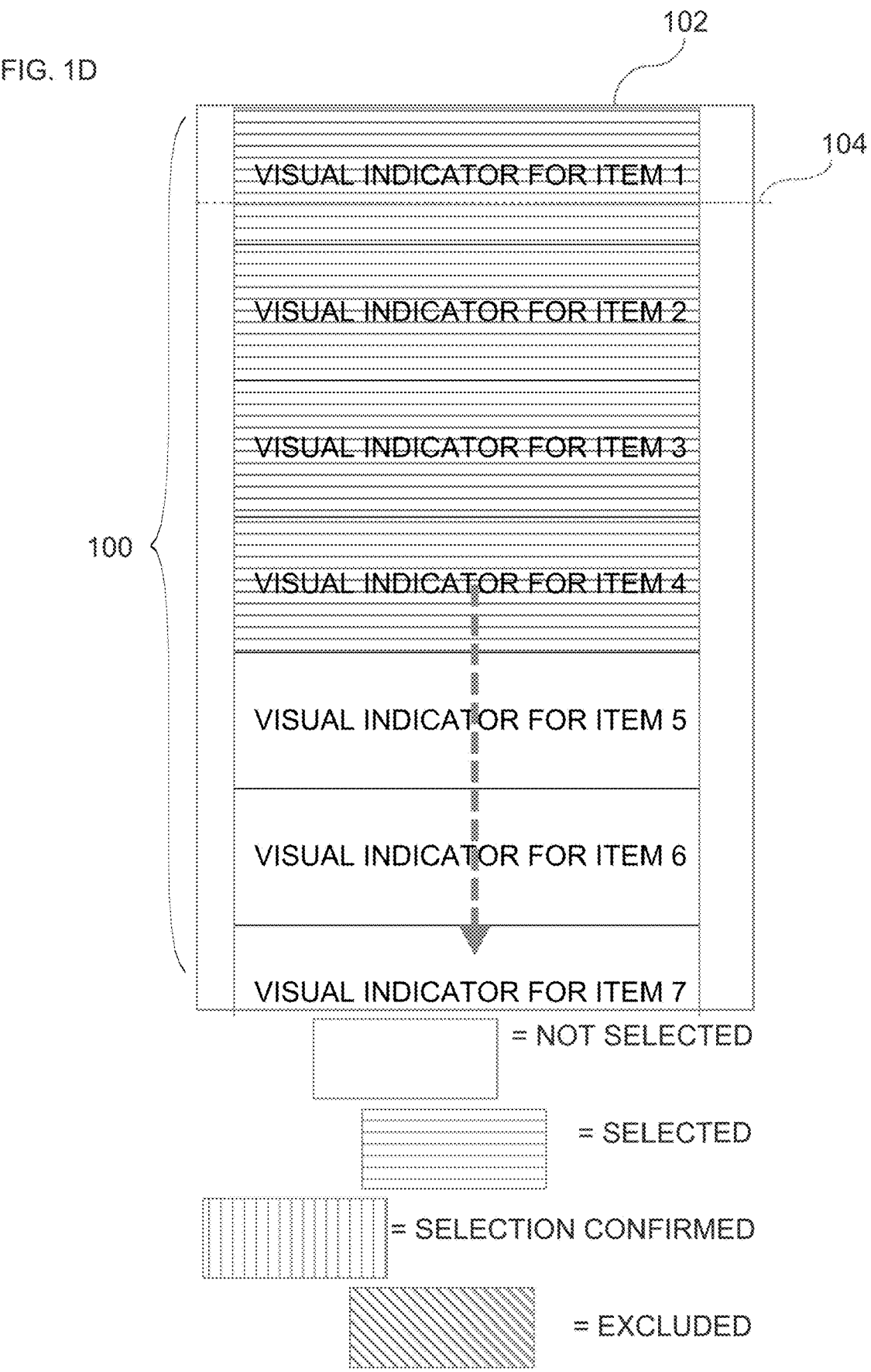

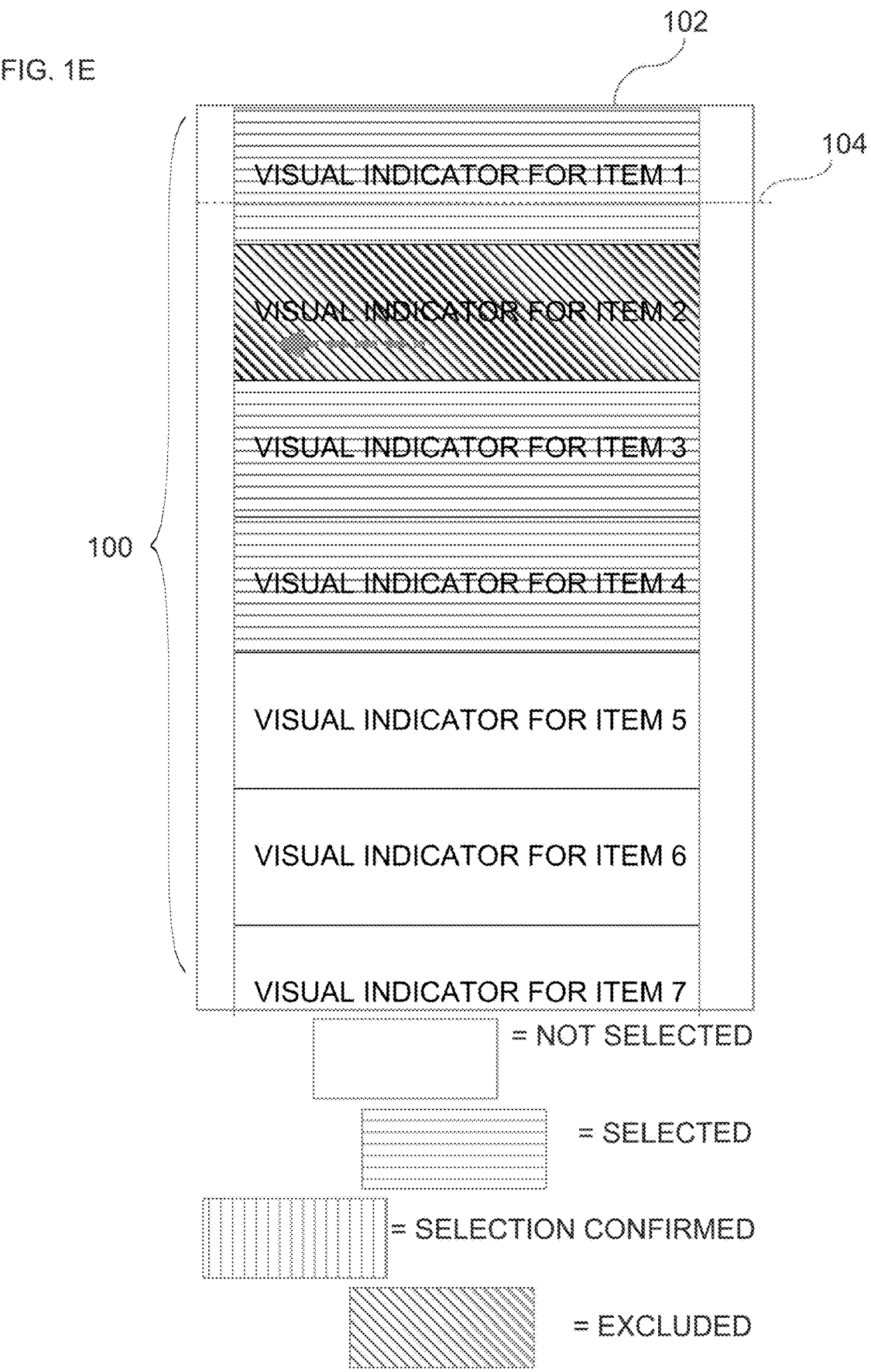

SCROLL SELECT CONTROL FOR USER INTERFACES

FIELD OF THE INVENTION

The present invention relates to computer-implemented techniques for selecting items and, more specifically, to a scroll-select control for user interfaces.

BACKGROUND

Users of computing devices are often faced with the task of selecting items, from a collection of items, for some operation. For example, the items may be a collection of electronic mail messages, and the task may be to select which messages to delete. As another example, the items may be files and the task may be select which files to move to a particular folder or directory. As yet another example, the items may be purchases listed on an accounts payable statement, and the task may be "accept for payment" the purchases that are legitimate.

Numerous approaches have been developed to assist users in selecting items, from a collection of items, for an operation. For example, to delete an individual email, some systems allow the user simply click on a visual representation of the email, and then press the delete button. In touch-screen systems, users may perform some gesture, such as a swipe-left, on the visual representation of an email to delete it.

Unfortunately, performing operations on individual items can be burdensome and time consuming. For example, an email account may have a "junk" folder that receives hundreds of email items every day. In most situations, users will want to delete every message in the folder. Performing separate "select" and "delete" operations for each email in the junk folder would take an inordinate amount of time. The burden is only slightly reduced in systems that combine the selection-action input and deletion-action input in a single gesture, such as swipe-left.

To avoid the need to perform operations on a per-item basis, most systems support mechanisms for performing batch operations. For example, most email systems allow a user to select all items in a collection with a single user-input action (e.g. the keystroke CTL-A). After all items have been selected, the user need only specify the action user-input of the operation once (e.g. selecting DELETE, dragging the selected items to a folder, etc.) and the action will be performed on all items in the collection.

Unfortunately, it is not always safe to blindly perform a bulk operation on all items in a collection. For example, it is possible that an important email message is buried somewhere within the hundreds of junk email items in the junk folder. Similarly, even when it is likely that all items on an accounts payable statement are legitimate, it would be imprudent to blindly indicate that all items on the accounts payable statement are legitimate without first at least skimming through the items.

Some systems have been designed with user interface mechanisms that allow the selection of a subset of the items in a collection based on the category of the items. For example, an email system may allow users to mark individual messages with a "star" and provide a control for bulk-selecting all starred messages, or all unstarred messages. Similarly, the system may provide a control for bulk-selecting all "read" or all "unread" messages. Unfortunately, the items on which a user wants to perform a bulk action (e.g. delete all junk mail) do not necessarily align with any pre-established category. For example, bulk-deleting all "junk" email may accidentally delete an important email message that was erroneously categorized as "junk".

In addition to mechanisms for performing bulk-selections based on categories, many user interfaces provide mechanisms for performing arbitrary bulk-selections. For example, in some systems, files are represented by icons. In such systems, a group of files may be selected by pressing a mouse button and, while the button is held down, dragging the mouse diagonally, and then releasing the mouse button. The system forms a selection box, with one corner at the position where the button was pressed down, and an opposite corner at the position where the button was released. Performing this operation selects that items that correspond to all icons that were enclosed by the selection box.

When the selection is among items in an ordered list, other bulk-selection techniques are possible. For example, assume that an email system displays a vertical list of visual indicators that correspond to email messages. The visual indicators may, for example, display the header information (e.g. subject, sender, recipients, etc.) of the corresponding emails. In such systems, a user may enter one form of user-input to designate the start of a selection, and another form of user-input to designate the end of a selection. For example, a user may "click" on the visual indicator of a first email message, and "shift-click" on the visual indicator of a second email message. In response, the system selects the first message, the second message, and all messages between the first message and the second message.

While existing techniques allow arbitrary bulk-selections, the techniques are error prone and inflexible. For example, if a user clicks on a first email message, and then scrolls down hundreds of email messages and clicks on a second email message (without remembering to shift-click), the system will not select the messages between the first message and the second message. Instead, the system will treat the selection of the second email message as the start of a new selection operation. If this happens, the user will have to scroll back up to try to find the first email message, and try the selection operation again.

Another example of the inflexibility of existing arbitrary bulk-selection mechanism is their inability to add new items to an existing group of selected items. For example, assume that a user has selected a set of email messages including a first email message, a second email message, and all messages between the first and second email messages. Once this selection group has been established, most systems only allow additional messages to be added to the selected group one message at a time (e.g. using a CTL-click). Further, if at any point the user accidentally clicks (without holding down the CTL button) on the visual indicator of an item, the entire selection operation must be restarted from scratch.

Bulk-selection is even more complicated in touch-screen interfaces. For example, the start of a bulk-selection operation may involve tapping on the visual indicator of an item. However, the visual indicator of the last item to be selected may not currently be on the screen. Thus, the user will need to scroll the list until the visual indicator of the last item to be selected is visible. Unfortunately, scrolling the list may involve a gesture such as dragging a finger upward or downward on the list of visual indicators. The dragging of the finger may be misinterpreted as selection of a different visual indicator (as opposed to a scroll operation), causing the user to have to restart the item selection operation from scratch.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1B is a block diagram of the display region of FIG. 1A after a user has scrolled the visual indicators in an upward direction, according to an embodiment;

FIG. 1D is a block diagram of the display region of FIG. 1C after a user has performed a scroll-down operation, according to an embodiment;

FIG. 1E is a block diagram of the display region of FIG. 1D after a user has excluded item 2, according to an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A bulk-selection operation is provided in which the same user input action automatically causes both (a) scrolling of a list of visual indicators of items, and (b) selection of the items that correspond to the visual indicators. Specifically, as the visual indicator of an item is scrolled beyond a "selection-triggering position", the visual indicator is visually marked to indicate that the corresponding item is selected. Optionally, the corresponding item may also be automatically added to a set of selected items. When scrolled the opposite direction, the items that have already been added to the set of selected items are not removed therefrom, even if the scrolling operation causes their visual indicators to cease to be beyond the selection-triggering position. In addition, the visual indicators continue to be marked to indicate that the corresponding items are selected. Thus, scrolling in one direction causes auto-selection of items, but scrolling in the opposite direction does not cause auto-deselection of items.

The techniques described herein combine the operations of item scrolling and item selection, and are therefore ideal for situations in which a user must scroll through long lists of items to find relatively rare items that are not to be selected for an operation. There are countless scenarios in which this is the case, and the techniques described herein are not limited to any particular scenario. Common situations in which users must scroll through a large collection of items to spot any items on which an operation should not be performed include scrolling through email in a junk folder to find email that should not be selected for deletion, scrolling through purchase records from a credit card statement to identify any purchases whose legitimacy is suspect, etc.

Scroll-Triggered Selection

Figure 1A:
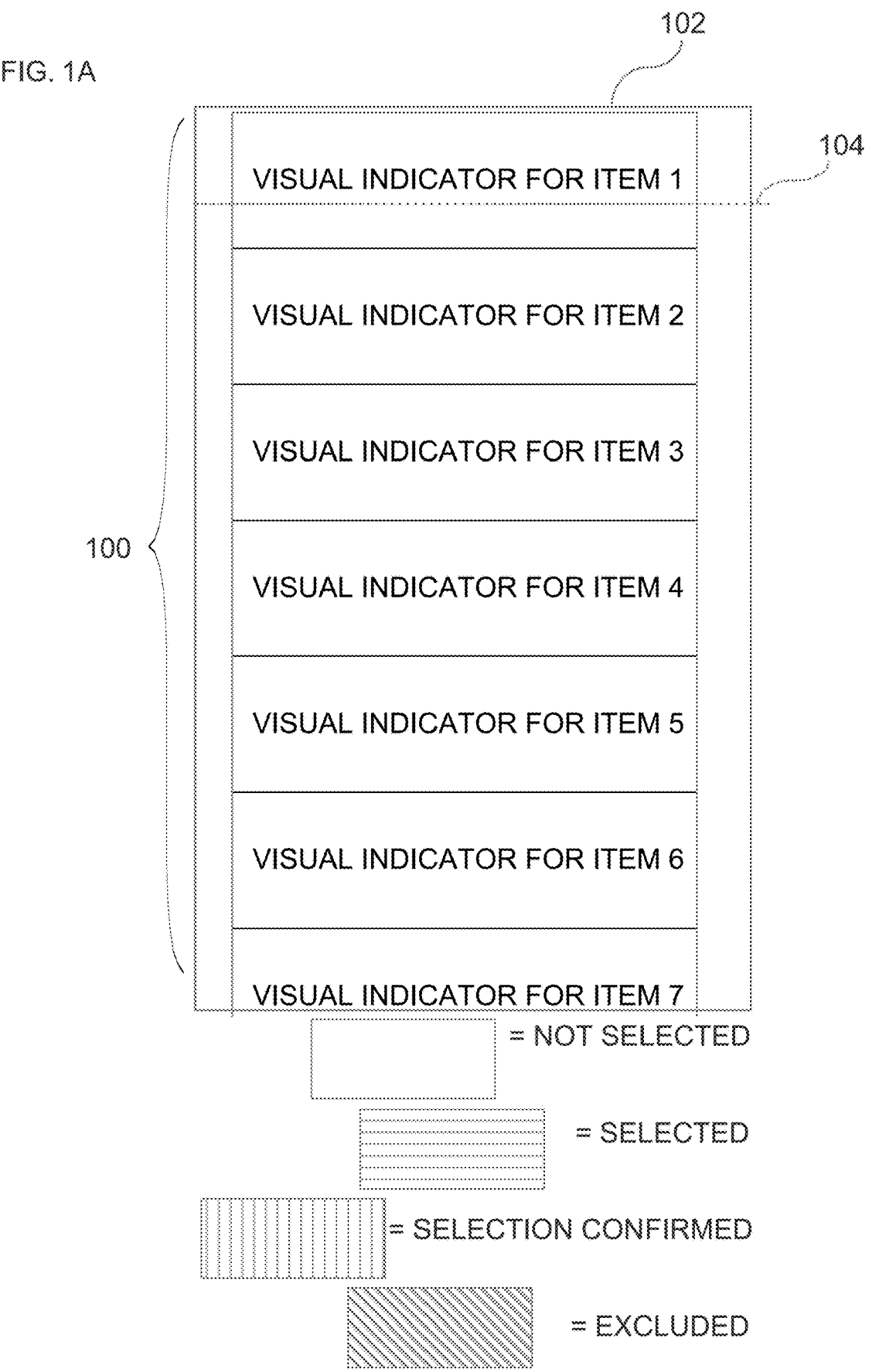
FIG. 1A is a block diagram of a display region that includes a set of visual indicators that are selectable using a scroll-selection control, according to an embodiment.

Referring to FIGS. 1A-1, they are block diagrams illustrating operation of a scroll-triggered selection mechanism, according to an embodiment. Specifically, FIG. 1A is a block diagram of a display region 102 that includes a set of visual indicators 100. Each visual indicator in the set of visual indicators 100 corresponds to an item. Depending on the implementation, the item may be a file, an email message, a report item, etc. The techniques described herein are not limited to any particular type of item. For the purpose of illustration, it shall be assumed that the items to which the visual indicators 100 correspond are email messages.

Display region 102 may fill the entire screen of a device (e.g. a mobile phone screen), or may fill a subset of screen (e.g. a window). Display region 102 is scrollable. That is, some mechanism is available for causing the visual indicators 100 to scroll within region 102. In the illustrated embodiment, visual indicators 100 are vertically aligned, so that the mechanism for scrolling visual indicators 100 allows the visual indicators 100 to be scrolled vertically. In embodiments where the visual indicators are horizontally aligned, the scrolling would be horizontal. The techniques described herein are not limited to any particular scroll direction or scrolling mechanism.

For the purpose of explanation, it shall be assumed that display region 102 fills the entire screen of a mobile device, and that the scrolling mechanism allows a user to scroll visual indicators 100 by swiping up (to scroll the visual indicators 100 upward) and by swiping down (to scroll the visual indicators 100 downward).

In FIG. 1A, the selection-triggering position 104 is represented as a line. In some embodiments, the selection-triggering position 104 has a visual indication on the screen. For example, region 102 may have a visible line, box, or other visual indication of the location of the selection-triggering position 104. In alternative embodiments, the selection-triggering position 104 has no visible indicator.

In the state illustrated in FIG. 1A, no items have been selected. Hence, no visual indicator is marked with a visual indication that the corresponding item is selected. In the present example, no item has been selected because no item has been scrolled upward beyond the selection-triggering position 104. The visual indicator for item 1 is partially passed the selection-triggering position 104, but not completely.

In the embodiment illustrated in FIG. 1A, the selection-triggering position 104 is near the top of region 102. However, the selection-triggering position 104 may be at other locations, and the techniques described herein are not limited to any particular selection-triggering position 104. In some embodiments, the selection-triggering position may be the top of region 102. In such an embodiment, a visual indicator passes "beyond" the selection-triggering position when the visual indicator has been scrolled upwardly completely out of region 102.

Referring to FIG. 1B, it illustrates the state of display region 102 after a user has scrolled the visual indicators 100 in the upward direction. As the trailing boundary of the visual indicator for item 1 passes beyond the selection-triggering position 104, the visual indicator for item 1 is visually marked to indicate that the item that corresponds to the indicator is selected. For the purpose of illustration, the various markings are indicated by cross hatching. However, the manner of marking the visual indicators may vary from implementation to implementation. For example, in one embodiment, colors are used to mark the visual indicators (e.g. gray means "not selected", light green means "selected", dark green means "selection confirmed", and yellow means "excluded"). In alternative embodiments, the markings may involve putting symbols, such as check marks and/or stars, on the visual indicators. The techniques described herein are not limited to any particular manner of marking the visual indicators.

In addition to marking the visual indicator of item 1 to indicate that item 1 is selected, the computing device that is generating display region 102 also updates data about which items are selected to indicate that the set of selected items includes item 1. At this point, since item 1 is the first item to be selected, the set of selected items only contains item 1.

Figure 1C:
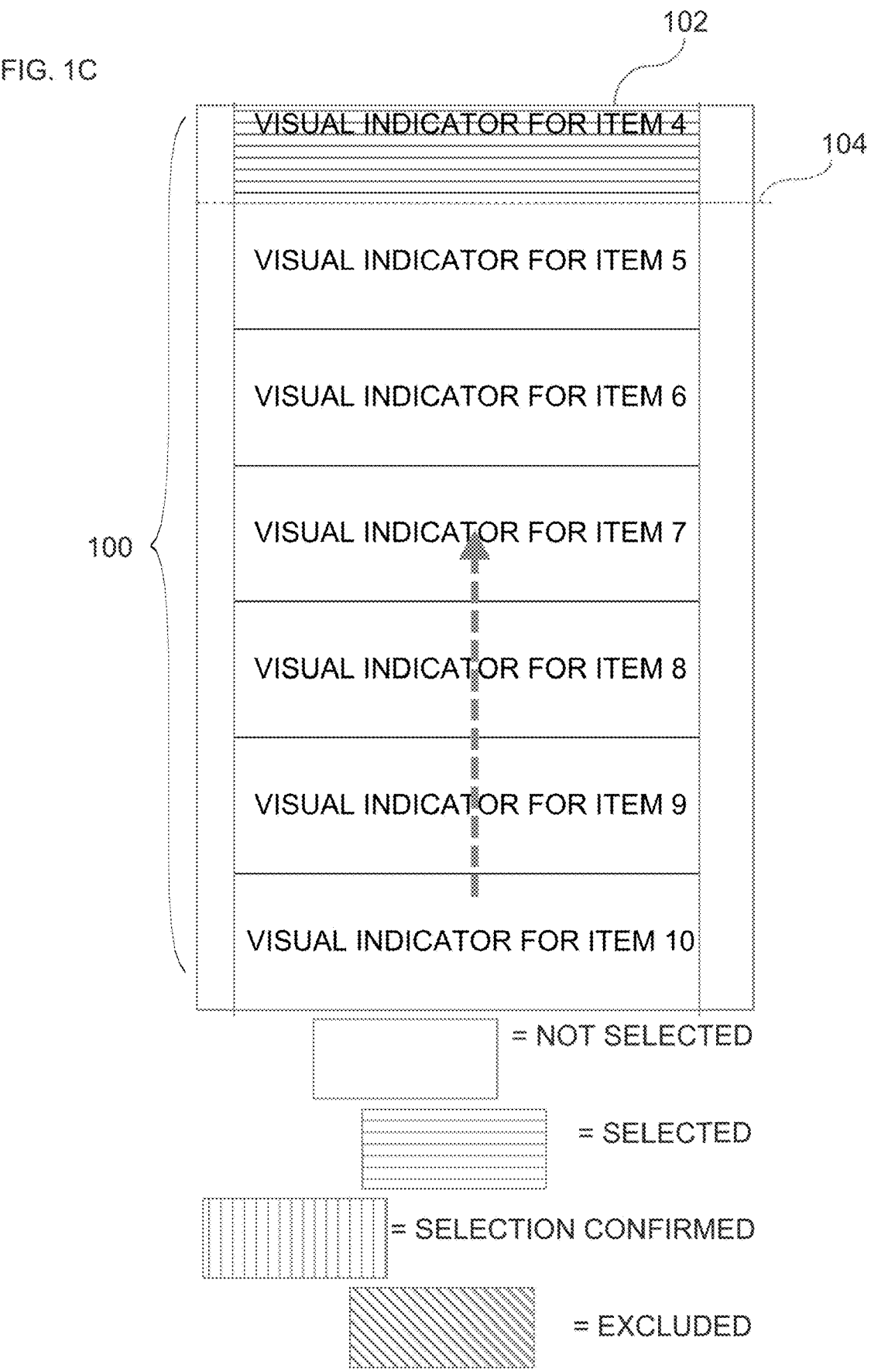
FIG. 1C is a block diagram of the display region of FIG. 1B after a user has scrolled the visual indicators even further upward, according to an embodiment.

Referring to FIG. 1C, it illustrates the state of display region 102 after a user has scrolled visual indicators 100 even further in the upward direction. As illustrated in FIG. 1C, the visual indicators for items 1, 2, 3 and 4 have been scrolled passed the selection-triggering position. Thus, items 1, 2, 3 and 4 have been added to the set of selected items. The visual indicator for item 4 is marked to indicate item 4 is selected. The visual indicators for items 1, 2, and 3 have been scrolled out of region 102, and are therefore not visible. However, if visible, the visual indicators for items 1, 2 and 3 would also be visually marked to indicate that the corresponding items have been selected.

As illustrated by FIGS. 1A-1C, the same action (e.g. an upward swipe) simultaneously performs both the operations of scrolling and selection. This is particularly helpful when a user must scroll through and select items from a relatively long list of items in which relatively few items should not be selected. For example, combining the scrolling and selection functions would be particularly useful when browsing through a junk mail folder to select items for deletion. In such a scenario, there may be hundreds of email messages that should be selected for deletion, and few or none to retain.

While a user scroll-selects a set of items, the user may have second thoughts about some item that has already been selected. Consequently, to view the visual indicator of the item in question, the user performs a scroll operation in the opposite direction of the scroll-selection direction. In the present example, assume that the user has second thoughts about selecting item 2. In order to make the visual indicator for item 2 visible, the user swipes down on visual region 102, thereby causing visual indicators 100 to scroll downward. The result of the swipe-down operation is illustrated in FIG. 1D.

Referring to FIG. 1D, it illustrates the state of region 102 after a user has scrolled down to return to the top of the list of visual indicators. Significantly, items 1, 2, 3 and 4 remain selected even though their respective visual indicators are no longer beyond the selection-triggering position 104. Thus, returning to evaluate a previously scroll-selected item does not lose the user's position in the scroll-selection operation.

Excluding Items from a Scroll-Selection Operation

For the purpose of illustration, it shall be assumed that, upon further consideration, the user determines that item 2 should not be selected. For example, item 2 may be an unsolicited email for some product in which the user actually has interest. Therefore, the user does not want item 2 selected for the deletion operation. To remove item 2 from the set of selected items, the user performs user input to indicate that item 2 should be excluded. The user input used to indicate that an item is to be excluded from selection may vary from implementation to implementation. For example, exclusion input may be indicated using icons, submenus, hidden gestures, etc. In the present example, it will be assumed that a swipe-left gesture is used to indicate that item 2 should be excluded from the selection.

In response to a swipe-left gesture that targets the visual indicator for item 2, item 2 is removed from the set of selected items, the visual indicator for item 2 ceases to be marked to indicate that item 2 is selected, and instead is marked to indicate that item 2 is excluded. FIG. 1E illustrates the state of display region 102 after item 2 has been excluded.

Figure 1F:
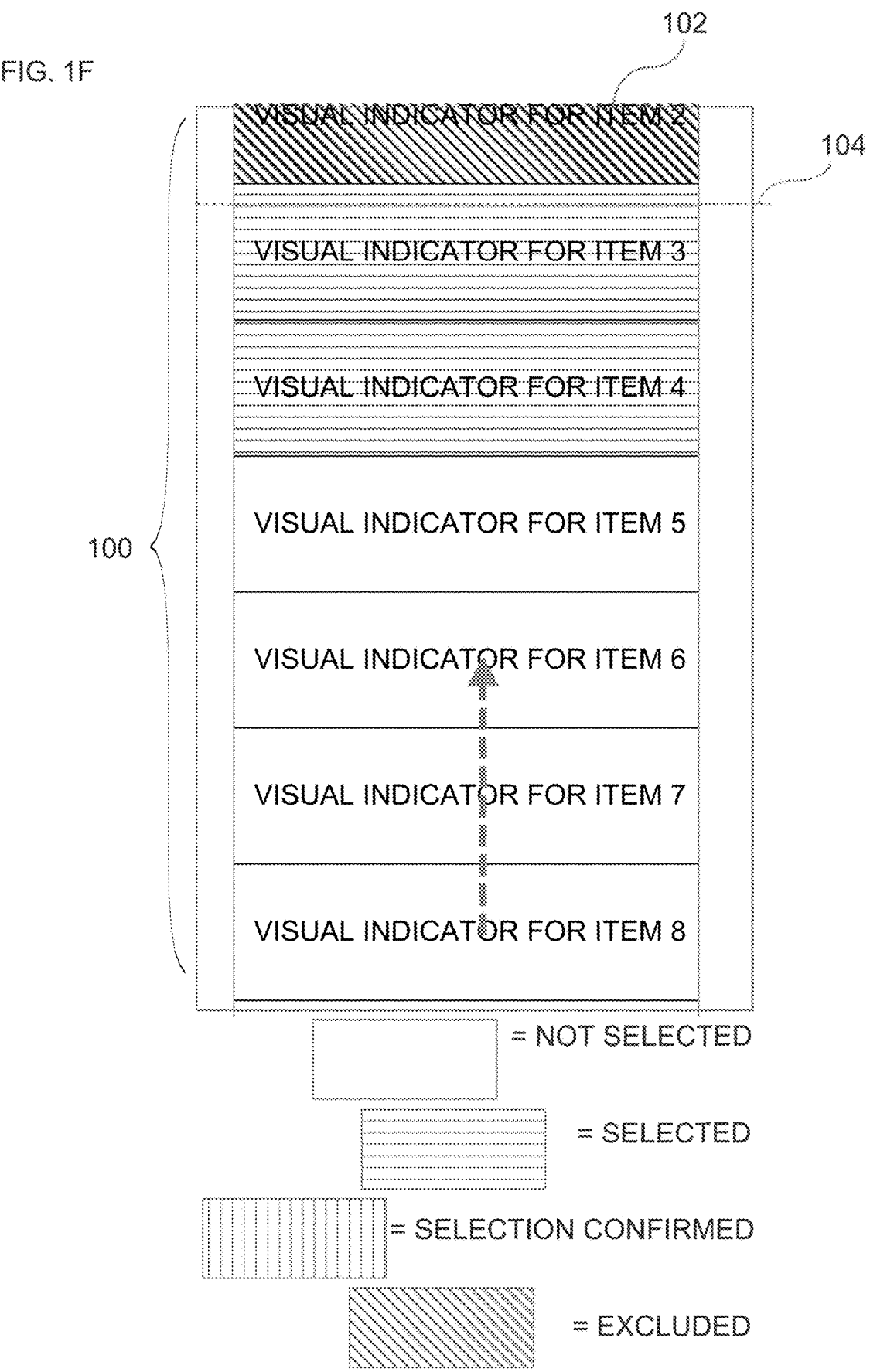
FIG. 1F is a block diagram of the display region of FIG. 1E after a user has scrolled an excluded item beyond the selection-triggering position, according to an embodiment.

After an item has been marked for exclusion, the item will remain excluded even if the visual indicator for the item is scrolled beyond the selection-triggering position 104. Thus, if the user scrolls the visual indicators 100 up so that the visual indicator for item 2 passes beyond the selection-triggering position 104, item 2 remains excluded and the visual indicator for item 2 continues to indicate that item 2 is excluded, as illustrated in FIG. 1F. The user may then continue to scroll-select items by scrolling visual indicators 100 up.

Pre-Indicated Actions and Post-Indicated Actions

When an action is to be performed on a set of selected items, the action may be pre-indicated or post-indicated. A pre-indicated action is an action that is specified before the selection operation. For example, the user may indicate a desire to perform the action "mark as approved" prior to selecting the items. In such pre-indicated action cases, the action is performed automatically in response to the selection of an item. Thus, when the scroll-selection techniques described herein are used in conjunction with pre-indicated actions, the act of scrolling a visual indicator beyond the selection-triggering position both selects the corresponding item and causes the pre-indicated action to be performed on the item.

A post-indicated action is an action that is specified after the selection process. For example, a user can use the scroll-selection techniques described herein to scroll-select a long list of junk mail items. After the items have been scroll-selected, the user may specify the action of "delete". Thus, the techniques described herein are equally applicable to both pre-indicated action situations and post-indicated action situations.

Selection-Confirmed Operations

In some situations, it may be desirable to have a safety net when performing bulk selection operations. Having a safety net may be particularly important for pre-indicated action situations, where the scroll-selection of an item may not only cause the selection, but may immediately trigger the action that has been designated. For example, assume that the items are accounts-payable items, and that the pre-indicated action is approval for payment. Assume that a user scroll-selects items 1-4, as illustrated in FIG. 1C. At that point, because item 2 has been approved, an electronic funds transfer may be immediately performed. Thus, even if user scrolls back and excludes item 2, it may be too late to halt the payment.

To provide a safety net to avoid such situations, a "confirmation" step may be added to the scroll-selection operation. Specifically, the computing device that is displaying region 102 may maintain data that indicates members of a "set of selected items" and separate data that indicates members of a set of "selection-confirmed items". The act of scrolling visual indicators automatically adds items to the set of selected items, but not to the set of selection-confirmed items. After scrolling has been used to add items to the set of selected items, some other user input causes all items in the set of selected items to be moved to the set of selection-confirmed items. The designated operation is then only performed on the set of selection-confirmed items.

The specific user input that "confirms" the selection (and therefore causes the items in the set of selected items to move to the set of selection-confirmed items) may vary from implementation to implementation. For example, in one embodiment, the user is presented with a graphical user interface object, such as a "confirm selection" button, that can be activated to cause confirmation of all currently-selected items.

Figure 1G:
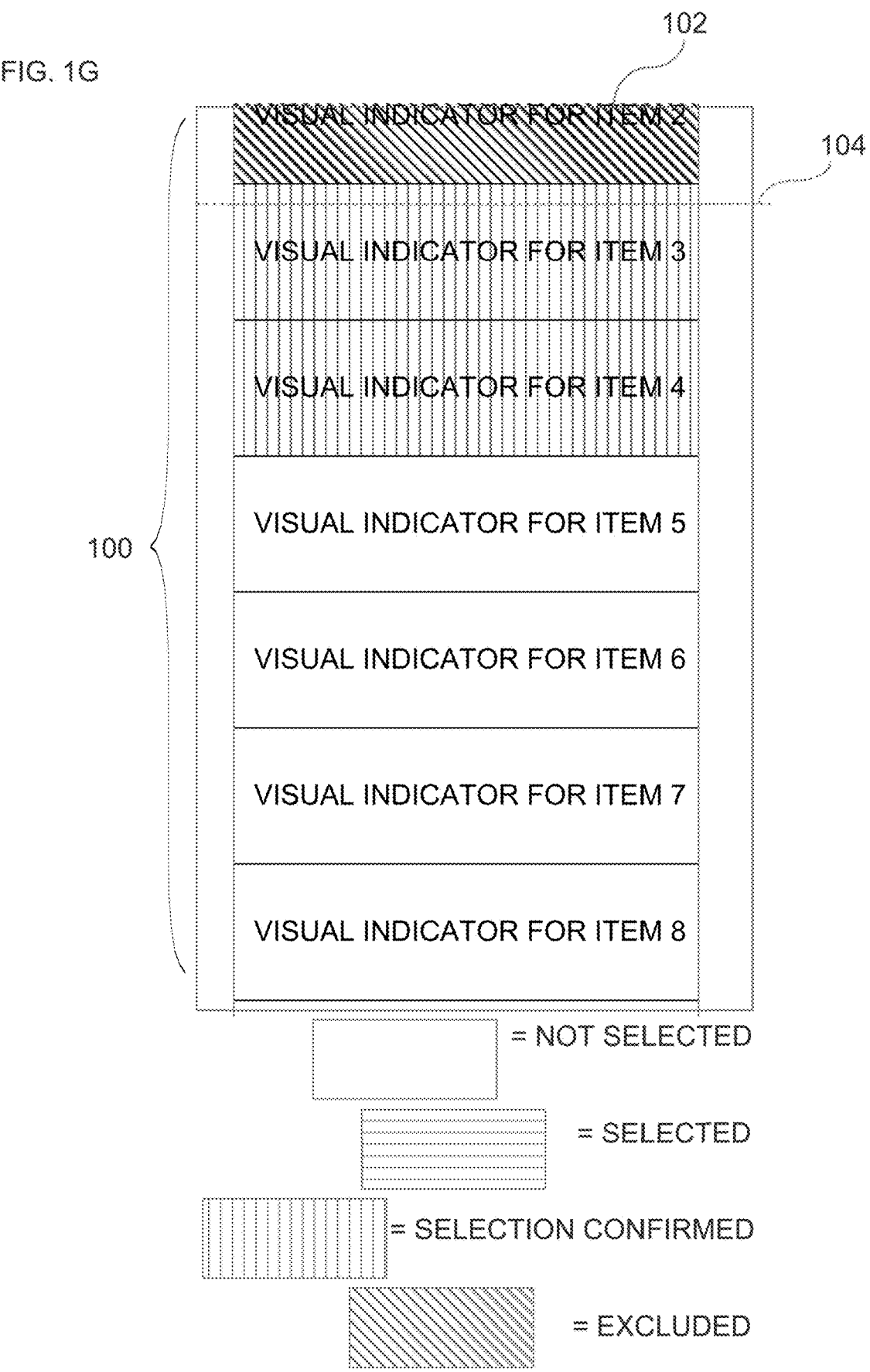
FIG. 1G is a block diagram of the display region of FIG. 1F after a user has confirmed the current selection, according to an embodiment.

FIG. 1G illustrates the state of region 102 after the user has confirmed the current selection. Specifically, those items that were in the set of selected items (items 1, 3 and 4) are moved to the set of selection-confirmed items, and the visual indicators of those items are visually marked to indicate that the corresponding items are selection-confirmed. It should be noted that confirming a selection has no effect on excluded items (e.g. item 2). Excluded items continue to be excluded.

After confirming a selection, the user can continue to scroll-select additional items. As the visual indicators for those items scroll beyond the selection-triggering position, the corresponding items are added to the set of selected items, and the visual indicators are marked to indicate that the corresponding items are selected items. For example, assume that a user scrolls visual indicators 100 up until the visual indicator for item 7 passes beyond the selection-triggering position, and then scrolls visual indicators 100 down again. Under these circumstances, the display region 102 may appear as indicated in FIG. 1H, where the visual indicator for item 2 is marked to indicate item 2 is excluded, the visual indicators for items 3 and 4 are marked to indicate that items 3 and 4 are selection-confirmed, and the visual indicators for items 5, 6 and 7 are marked to indicate items 5, 6 and 7 are selected (but not selection-confirmed).

Figure 1H:
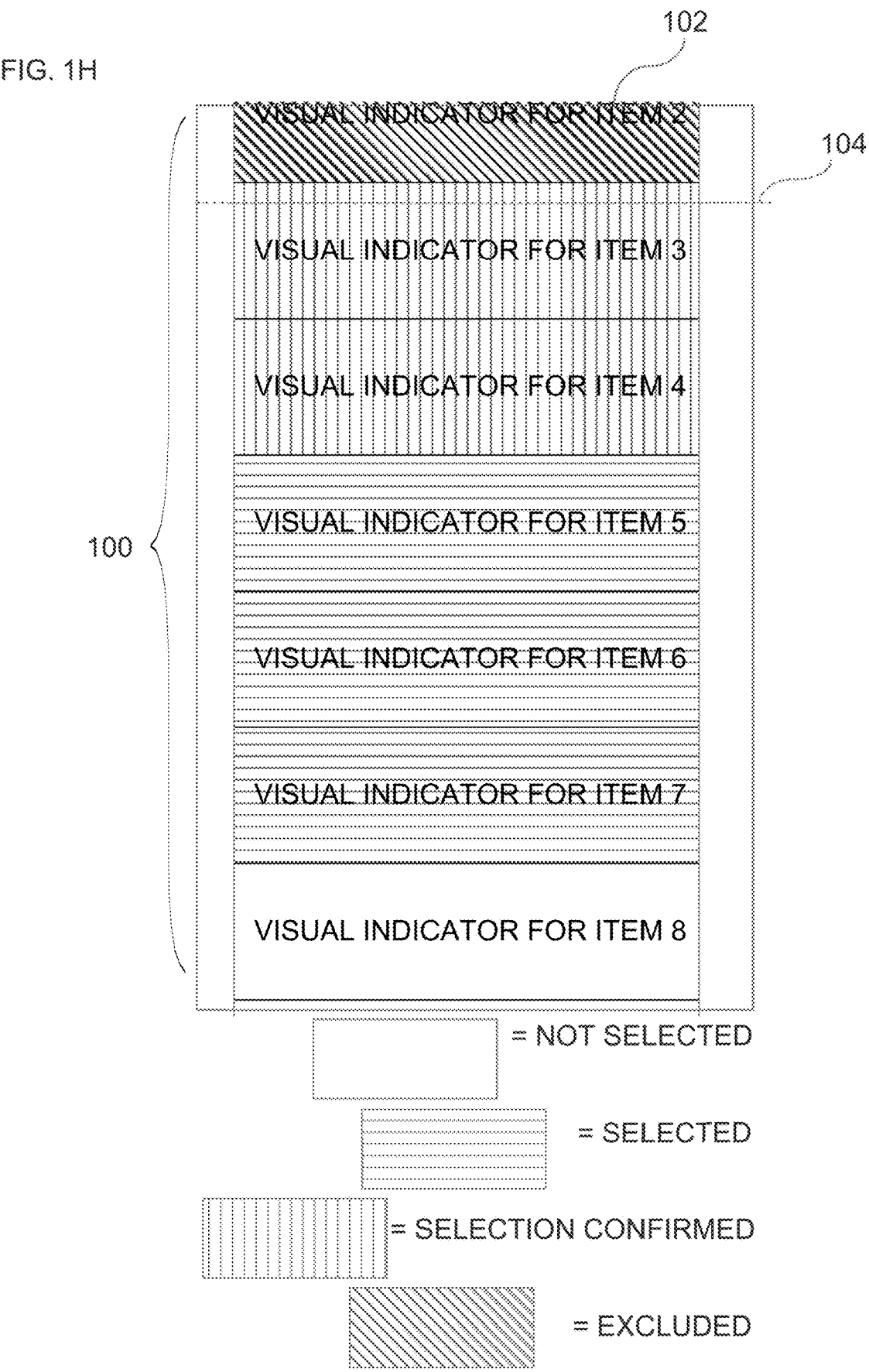
FIG. 1H is a block diagram of the display region of FIG. 1G after a user has further scroll-selected additional items, according to an embodiment.

If, at the point illustrated in FIG. 1H, the user specified the batch-action to be performed, it is performed only on the selection-confirmed items. On the other hand, if the user enters the confirmation user input, the items that are in the set of selected items are moved to the set of selection-confirmed items.

Using Selection-Confirmed to Perform Multi-Context Selections

As explained above, the need to "confirm" a set of scroll-selected items acts as a safety net in situations where erroneous selection may trigger immediate undesirable actions. According to one embodiment, selection confirmation may also be used in conjunction with scroll-selection to perform multi-context selections. For example, assume that a user desires to forward a large set of email messages to a friend. However, the email messages that the user desires to send are in two different email folders. Normally, the user would have to select a batch of email from one folder, and then forward the batch, and then select another batch of email from the other folder, and then forward that batch. If the user switches to the second folder without sending the first batch, the email in the first folder ceases to be selected. That is, the context switch loses the selection information.

In one embodiment, the set of confirmation-selected items is maintained through context switches. Thus, a user can scroll-selection to select items in one folder/screen/window, and then confirm the selection. Confirmation of the selection adds the items to the set of selection-confirmed items. The user than can navigate to a different folder/screen/window and select additional items using scroll-selection. Upon confirmation of the selection of those additional items, the additional items are added to the same set of selection-confirmed items. This process may be repeated any number of times to select items in any number of contexts.

Once all of the desired items have been added to the set of selection-confirmed items, the user may then trigger the desired operation. In the present example, the user may cause the selected batch of email to be forwarded to a friend in a single batch.

Removing Exclusions

In many situations, it is desirable to remove the excluded-status of an item. For example, assume that the items are lists of accounts-payable items, and the bulk-action is to mark the items as approved for payment. Under these circumstances, a user may want to initially mark any suspicious items as "excluded". This allows the user to continue the scroll-selection process without having to hold up approval on the other items while the user investigates the suspicious items. When the user has time to investigate the suspicious items, the user may find that one of the items is legitimate. Under these circumstances, the user can enter exclusion-removal user input to cause the item to be removed from the set of excluded items. The exclusion-removal user input may be any appropriate user input or gesture. The techniques described herein are not limited to any particular type of user input for removing the exclusion status of items.

When the exclusion status of an item is removed, the visual indicator that corresponds to the item ceases to be marked to indicate the item is excluded. According to one embodiment, removal of the exclusion status automatically causes the item to be added to the set of selected items (and the visual indicator is marked accordingly). In an alternative embodiment, removal of the exclusion status removes the exclusion status but does not automatically cause the corresponding item to be selected. In yet another embodiment, removal of the exclusion states causes the item to revert to the status that the item had at the time the item was excluded (which may be unselected, selected, or selection-confirmed).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
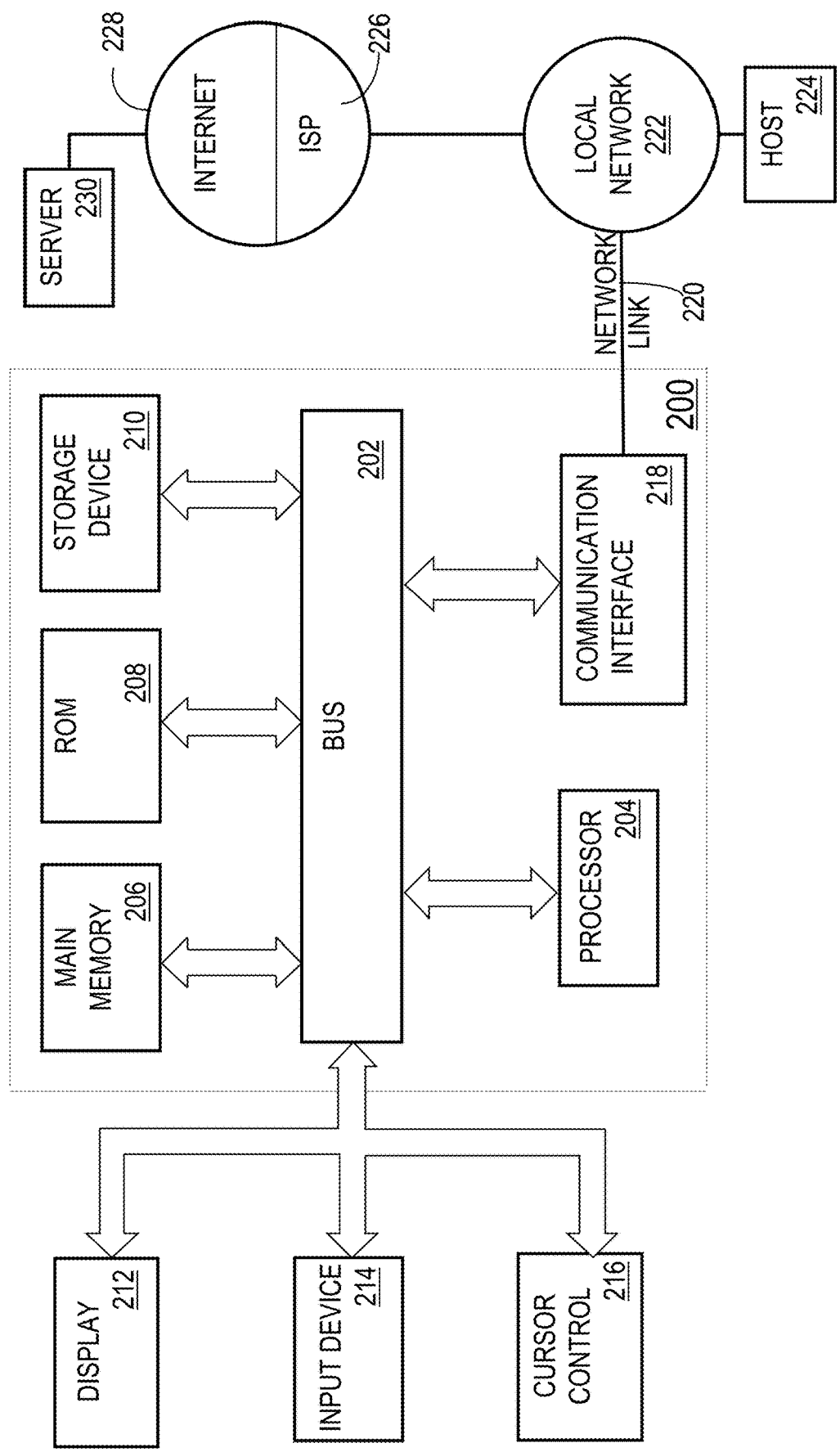
FIG. 2 is a block diagram of a computer system that may be used to implement the scroll-selection techniques described herein.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, AR/VR inputs, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge. Such storage media may be locally attached, accessible over a local network, or accessible over a wide area network (e.g. "in the cloud").

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for adding items from a set of unselected items to a set of selected items, comprising:
displaying, on a screen of a device, a user interface that includes a list of visual indicators;
wherein each indicator in the list of visual indicators corresponds to an item in the set of unselected items;
establishing a particular scroll position on the screen as the scroll position for automatically selecting items that correspond to visual indicators that scroll beyond the particular scroll position in a first direction;
wherein the particular scroll position is established at a fixed position on the screen that allows each visual indicator in the list of visual indicators to be fully displayed on the screen before the visual indicator is scrolled in the first direction beyond the particular scroll position;
without changing the position, on the screen, of the particular scroll position, performing:
receiving user input that scrolls the list of visual indicators;
determining whether the user input scrolls the list of visual indicators in the first direction or a second direction that is opposite the first direction;
responsive to determining that the user input scrolls the list of visual indicators in the first direction:
while the list of visual indicators scrolls in the first direction:
detecting when any visual indicator in the list of visual indicators scrolls in the first direction beyond the particular scroll position;
responsive to detecting that any visual indicator in the list of visual indicators scrolls in the first direction beyond the particular scroll position, performing the steps of:
automatically adding the item that corresponds to the visual indicator to the set of selected items;
marking the visual indicator with a first visual indication that indicates that item that corresponds to the first visual indication is a member of the set of selected items;
responsive to determining that the user input scrolls the list of visual indicators in the second direction;
while the list of visual indicators scrolls in the second direction:
when any visual indicator marked with the first visual indication scrolls in the second direction to a position in which the visual indicator is no longer beyond the particular scroll position, continuing to display the visual indicator with the first visual indication, and continuing to include the item that corresponds to the visual indicator in the set of selected items;
wherein the method is performed by one or more computing devices.

2. The method of claim 1 further comprising:
while the set of selected items includes a particular set of items, receiving confirmation user input; and
in response to receiving the confirmation user input, performing the steps of:
removing the particular set of items from the set of selected items;
adding the particular set of items to a set of selection-confirmed items;
ceasing to mark a set of visual indicators that correspond to the particular set of items with the first visual indication; and
marking the set of visual indicators that correspond to the particular set of items with a second visual indication that is different than the first visual indication.

3. The method of claim 2 further comprising:
after receiving the confirmation user input, switching context to a second user interface that includes a second list of visual indicators;
wherein each indicator in the second list of visual indicators corresponds to an item in a second set of unselected items;
while switching context, retaining data about the set of selection-confirmed items;
receiving input that scroll-selects a second set of items from the second set of unselected items;
receiving second confirmation input;
in response to the second confirmation input, adding the second set of items to the set of selection-confirmed items;
receiving input to perform a particular operation; and
performing the particular operation on each item in the set of selection-confirmed items.

4. The method of claim 3 wherein switching context includes switching from a first window to a second window.

5. The method of claim 3 wherein switching context includes switching from a first folder to a second folder.

6. The method of claim 1 further comprising:
receiving exclusion user input that targets a particular visual indicator in the list of visual indicators;
wherein the particular visual indicator corresponds to a particular item;
in response to receiving the exclusion user input, performing the steps of:
determining whether the particular item is a member of the set of selected items;
if the particular item is a member of the set of selected items, then
removing the particular item from the set of selected items, and
ceasing to mark the particular visual indicator with the first visual indication;
adding the particular item to a set of excluded items; and
marking the particular visual indicator with a second visual indication that is different than the first visual indication.

7. The method of claim 6 wherein the exclusion user input is received while the particular item is a member of the set of selected items.

8. The method of claim 6 wherein the exclusion user input is received while the particular item is not a member of the set of selected items.

9. The method of claim 6 further comprising:
after adding the particular item to the set of excluded items, receiving second user input that scrolls the list of visual indicators in the first direction;
detecting that the particular visual indicator scrolls in the first direction beyond the particular scroll position;
responsive to detecting that the particular visual indicator scrolls in the first direction beyond the particular scroll position:
retaining the particular item in the set of excluded items without adding the particular item to the set of selected items, and
continuing to mark the particular visual indicator with the second visual indication without marking the particular visual indicator with the first visual indication.

10. The method of claim 9 wherein:
within the list of visual indicators, one or more visual indicators are in positions that are to the second direction from the position of the particular visual indicator;
at a time the second user input is received, the items that correspond to the one or more visual indicators are not members of the set of selected items;
the second user input causes the one or more visual indicators to scroll beyond the particular scroll position;
the method further comprises, responsive to detecting that the one or more visual indicators scroll beyond the particular scroll position, performing the steps of:
automatically adding the items that correspond to the one or more visual indicators to the set of selected items; and
marking the one or more visual indicators with the first visual indication.

11. One or more non-transitory computer-readable media storing instructions for adding items from a set of unselected items to a set of selected items, wherein, when executed by one or more computing devices, the instructions cause:
displaying, on a screen of a device, a user interface that includes a list of visual indicators;
wherein each indicator in the list of visual indicators corresponds to an item in the set of unselected items;
establishing a particular scroll position on the screen as the scroll position for automatically selecting items that correspond to visual indicators that scroll beyond the particular scroll position in a first direction;
wherein the particular scroll position is established at a fixed position on the screen that allows each visual indicator in the list of visual indicators to be fully displayed on the screen before the visual indicator is scrolled in the first direction beyond the particular scroll position;
without changing the position, on the screen, of the particular scroll position, performing:
receiving user input that scrolls the list of visual indicators;
determining whether the user input scrolls the list of visual indicators in the first direction or a second direction that is opposite the first direction;
responsive to determining that the user input scrolls the list of visual indicators in the first direction:
while the list of visual indicators scrolls in the first direction:
detecting when any visual indicator in the list of visual indicators scrolls in the first direction beyond the particular scroll position;
responsive to detecting that any visual indicator in the list of visual indicators scrolls in the first direction beyond the particular scroll position, performing the steps of:
automatically adding the item that corresponds to the visual indicator to the set of selected items;
marking the visual indicator with a first visual indication that indicates that item that corresponds to the first visual indication is a member of the set of selected items;
responsive to determining that the user input scrolls the list of visual indicators in the second direction that is opposite the first direction; and:
while the list of visual indicators scrolls in the second direction:
when any visual indicator marked with the first visual indication scrolls in the second direction to a position in which the visual indicator is no longer beyond the particular scroll position, continuing to display the visual indicator with the first visual indication, and continuing to include the item that corresponds to the visual indicator in the set of selected items.

12. The one or more non-transitory computer-readable media of claim 11 further comprising instructions that, when executed by one or more computing devices, cause:
while the set of selected items includes a particular set of items, receiving confirmation user input; and
in response to receiving the confirmation user input, performing the steps of:
removing the particular set of items from the set of selected items;
adding the particular set of items to a set of selection-confirmed items;
ceasing to mark a set of visual indicators that correspond to the particular set of items with the first visual indication; and
marking the set of visual indicators that correspond to the particular set of items with a second visual indication that is different than the first visual indication.

13. The one or more non-transitory computer-readable media of claim 12 further comprising instructions that, when executed by one or more computing devices, cause:
after receiving the confirmation user input, switching context to a second user interface that includes a second list of visual indicators;
wherein each indicator in the second list of visual indicators corresponds to an item in a second set of unselected items;
while switching context, retaining data about the set of selection-confirmed items;
receiving input that scroll-selects a second set of items from the second set of unselected items;
receiving second confirmation input;
in response to the second confirmation input, adding the second set of items to the set of selection-confirmed items;
receiving input to perform a particular operation; and
performing the particular operation on each item in the set of selection-confirmed items.

14. The one or more non-transitory computer-readable media of claim 13 wherein switching context includes switching from a first window to a second window.

15. The one or more non-transitory computer-readable media of claim 13 wherein switching context includes switching from a first folder to a second folder.

16. The one or more non-transitory computer-readable media of claim 11 further comprising instructions that, when executed by one or more computing devices, cause:
- receiving exclusion user input that targets a particular visual indicator in the list of visual indicators;
- wherein the particular visual indicator corresponds to a particular item;
- in response to receiving the exclusion user input, performing the steps of:
  - determining whether the particular item is a member of the set of selected items;
  - if the particular item is a member of the set of selected items, then
    - removing the particular item from the set of selected items, and
    - ceasing to mark the particular visual indicator with the first visual indication;
  - adding the particular item to a set of excluded items; and
  - marking the particular visual indicator with a second visual indication that is different than the first visual indication.

17. The one or more non-transitory computer-readable media of claim 16 wherein the exclusion user input is received while the particular item is a member of the set of selected items.

18. The one or more non-transitory computer-readable media of claim 16 wherein the exclusion user input is received while the particular item is not a member of the set of selected items.

19. The one or more non-transitory computer-readable media of claim 16 further comprising instructions that, when executed by one or more computing devices, cause:
- after adding the particular item to the set of excluded items, receiving second user input that scrolls the list of visual indicators in the first direction;
- detecting that the particular visual indicator scrolls in the first direction beyond the particular scroll position;
- responsive to detecting that the particular visual indicator scrolls in the first direction beyond the particular scroll position:
  - retaining the particular item in the set of excluded items without adding the particular item to the set of selected items, and
  - continuing to mark the particular visual indicator with the second visual indication without marking the particular visual indicator with the first visual indication.

20. The one or more non-transitory computer-readable media of claim 19 wherein:
- within the list of visual indicators, one or more visual indicators are in positions that are to the second direction from the position of the particular visual indicator;
- at a time the second user input is received, the items that correspond to the one or more visual indicators are not members of the set of selected items;
- the second user input causes the one or more visual indicators to scroll beyond the particular scroll position;
- the instructions include instructions that, when executed by one or more computing devices, cause, responsive to detecting that the one or more visual indicators scroll beyond the particular scroll position, performing the steps of:
  - automatically adding the items that correspond to the one or more visual indicators to the set of selected items; and
  - marking the one or more visual indicators with the first visual indication.

* * * * *